United States Patent
Kennedy

[11] Patent Number: 5,741,394
[45] Date of Patent: Apr. 21, 1998

[54] APPARATUS FOR ATTACHING A GOLF CLUB GRIP TO A GOLF CLUB SHAFT

[76] Inventor: Patrick Kennedy, 908 S. Prospect St., Burlington, Vt. 05401

[21] Appl. No.: 617,118

[22] Filed: Mar. 18, 1996

[51] Int. Cl.⁶ ............................. A63B 57/00; B25G 3/00
[52] U.S. Cl. ............................. 156/391; 156/293; 156/294; 220/571; 473/298; 473/300
[58] Field of Search ............................. 473/298, 300; 273/81 R; 156/293, 294, 391, 390, 538, 535, 579; 141/110; D8/14.1; 30/324; 220/573, 570, 571; 15/257.06

[56] References Cited

U.S. PATENT DOCUMENTS

| | | | |
|---|---|---|---|
| 117,723 | 8/1871 | Baker | 141/110 X |
| 175,599 | 4/1876 | Fisher | 30/324 |
| 786,101 | 3/1905 | Cooper | 141/110 |
| 884,489 | 4/1908 | Hanson | 141/110 X |
| 1,669,053 | 5/1928 | Hamel | 473/300 X |
| 1,836,014 | 12/1931 | Chamberlain | 141/110 X |
| 2,038,840 | 4/1936 | Hall | 473/300 X |
| 2,833,450 | 5/1958 | Sherbondy | D8/14.1 X |
| 3,208,144 | 9/1965 | Cronheim | 30/324 |
| 3,915,782 | 10/1975 | Davis et al. | 473/298 X |
| 4,332,282 | 6/1982 | Strange | 141/98 X |
| 5,123,576 | 6/1992 | Lawrence | 15/257.06 |
| 5,281,288 | 1/1994 | Murray et al. | 473/300 X |
| 5,285,824 | 2/1994 | Krstovic | 220/573 X |
| 5,288,359 | 2/1994 | Stobbie, IV et al. | 473/300 X |
| 5,400,916 | 3/1995 | Weber | 220/570 X |
| 5,419,031 | 5/1995 | McLendon | 473/300 X |
| 5,419,797 | 5/1995 | Ciamaga et al. | 473/300 X |
| 5,429,703 | 7/1995 | Hartman et al. | 473/300 X |
| 5,562,131 | 10/1996 | Drawbaugh | 220/573 X |

*Primary Examiner*—Jeff H. Aftergut
*Attorney, Agent, or Firm*—Michael W. Starkweather

[57] ABSTRACT

A device for assisting with installing a slip-on golf grip onto a golf club shaft. The device or tool has a funnel that is used for mounting a golf club grip thereon, for pouring solvent into the mounted grip with solvent that is residing in the tool container portion, and for pouring unused solvent into a solvent storage container. Because of the shape, the tool can be easily held below a golf shaft with one hand and pouring solvent thereon with another hand. There is a notch on the tool that allows a portion of the golf club shaft to be placed below the rim of the container portion of the tool during the pouring of solvent thereon. Additionally, the notch serves to aid the golf club shaft longitudinal axis to be aligned parallel to the tool's longitudinal axis.

9 Claims, 2 Drawing Sheets

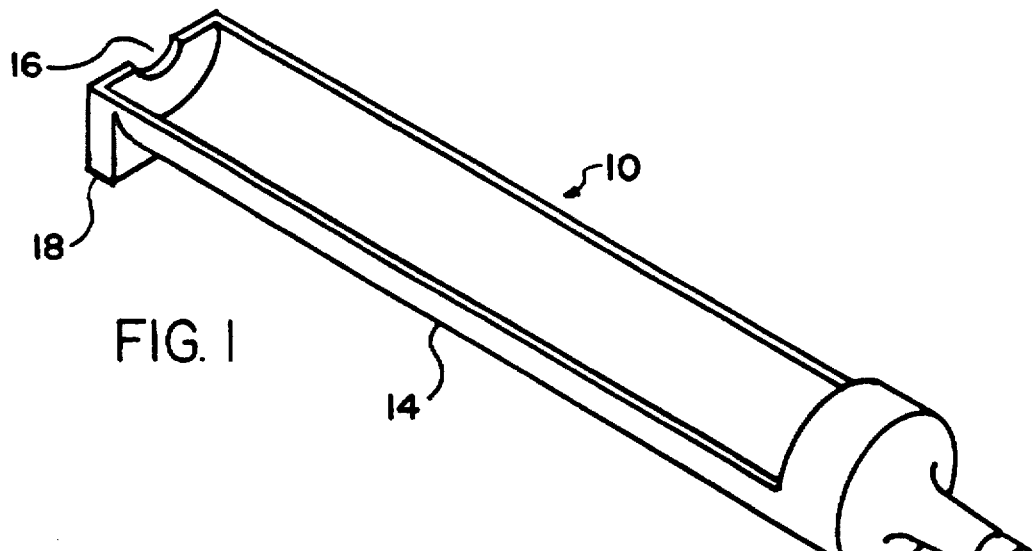
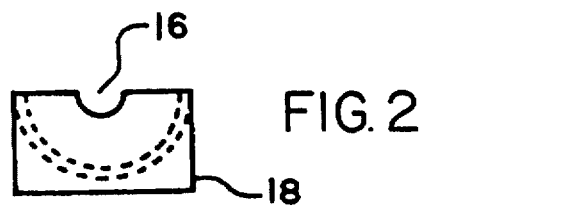
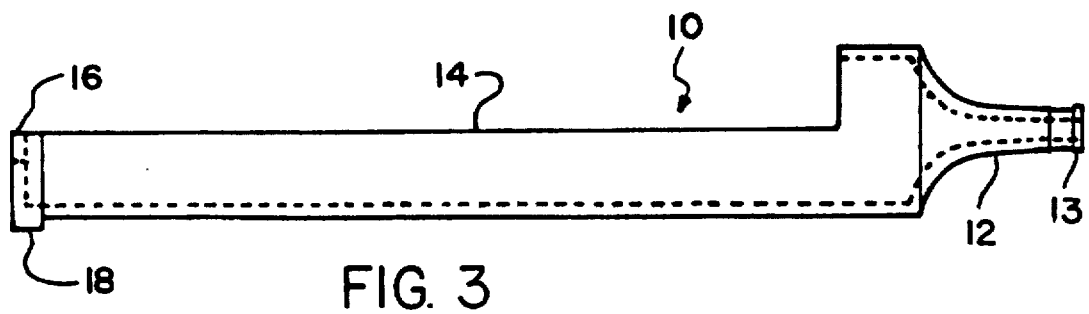
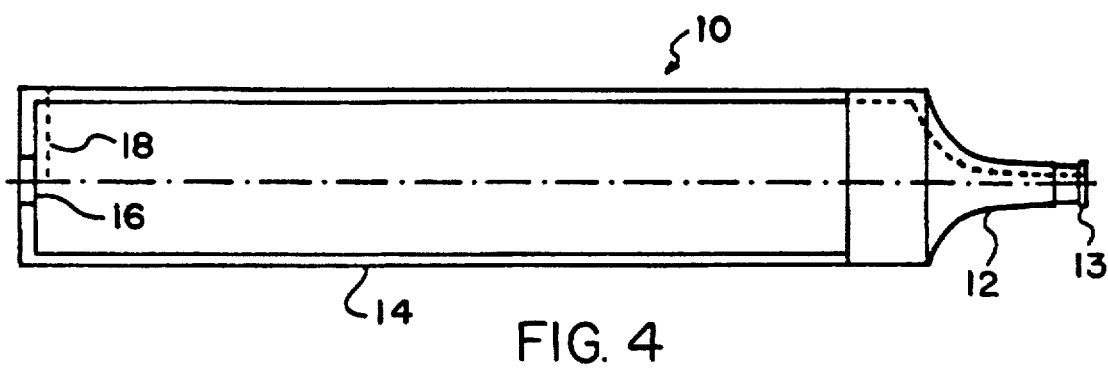

APPARATUS FOR ATTACHING A GOLF CLUB GRIP TO A GOLF CLUB SHAFT

BACKGROUND OF THE INVENTION

1. Field of the Invention

The present invention generally relates to a device that is used in the attachment of a slip-on golf club grip onto a golf club shaft.

2. Description of the Related Art

The grip is the only contact a player has with the golf club. Period. The grip must be properly sized for each player and must feel comfortable in his or her hands, for it is the grip that initially introduces the player to the mystical element known as "feel."

When a golfer picks up a club, his perception of it comes from the grip. Fresh grips can make a player's clubs feel like new again and will instill long lost confidence in his game. In short, grips play a major role in how a club performs for an individual and thus deserve the full attention of club makers.

The wide variety of grip styles and types available today means that all levels of players are able to find a grip to their liking. Additionally, through the expertise of the clubmaker, that grip can be properly sized to any golfer for maximum playability.

At the beginning of the modern era of golf, the primary, if not only, material used for grips was leather. While there may have been different colors of leather or different types of leather, the material was basically the same. As slip-on rubber grips were developed in the 1950's, golfers soon were offered many new styles and textures of grips. These rubber grips proved to be much easier to maintain than leather, they were easier to install and they were cheaper too. Slip-on grips also presented an opportunity for golf equipment professionals to greatly increase the amount of regripping they could perform at a price that was acceptable to the golfer. Today, there are more than a dozen rubber grip manufacturers producing over 250 styles in a variety of core sizes to fit virtually every preference.

The most common grip in golf today is the rubber composition slip-on grip. Available in a variety of compound mixes, colors and designs, this type of grip is found on the majority of original equipment manufactures and component clubs.

Grip manufacturers can alter the softness of a grip and its texture by varying the exact mix of rubber compounds used to make it. The inner cores of grips can be designed with ribs to change the feel of the grip. They may have a vertical rib up the backside to aid in hand positioning, or they may be round to fit naturally in a player's hands.

Rubber grips are commonly made through injection molding, compression molding or transfer molding. They are then buffed and filled with paint. They are produced in the widest range of core sizes and, due to their somewhat elastic properties, they can be made to fit a number of different sized shaft butt diameters, although this will definitely have an influence on the finished size of the grip.

Rubber composition grips have been the industry standard for nearly 40 years now. They provide a good traction surface in a variety of playing conditions and require minimal care. They also are the most affordable grips on the market.

Grip installation can be as simple as taking a piece of 2-way tape, placing it on the shaft, squirting on some grip solvent and slipping on the grip. However, there are other major steps that need to be considered.

To properly install a grip to the correct size, the shaft butt size must be recognized, the grip core size considered and the amount (and thickness) of any buildup tape calculated. Simply sliding a grip on a shaft often will not yield a correctly sized grip. Never assume the core size of a grip will be matched to the butt size of the shaft without first inspecting the mouth or lip of the grip for the indicator of grip size, and using calipers or a shaft butt gauge to determine the diameter of the shaft. Also, do not assume that all masking (i.e. build-up) tape will be of the same thickness. Using "unmatched" grips and shafts and/or unusually-sized tape can yield grips that are too large, while other combinations might produce grips smaller than anticipated. A pre-inspection of grips, shafts and build-up tape is imperative in grip installation.

It is equally vital that the effects of the grip upon other club specifications be considered. The total weight of the club is affected by the grip. A heavier grip has the effect of reducing the swingweight of the club, while at the same time increasing the overall weight of the club. The converse is true with lighter weight grips. There are some grip choices that can change swingweight by more than eight points and overall weight almost one ounce.

The grip's weight also will have an effect on the balance point of the club. Heavier grips move the point of balance toward the butt end of the club, thus having an effect on the feel of the club.

Problems:

Since the development of the slip-on grip in the 1950's, the replacement of the golf grip has remained a relatively messy process. To prepare the inside core surface of the grip for sticking to the tape covered golf shaft a special solvent is often poured into the grip. Pouring the solvent into the small mouth of the grip is a tricky process that often causes the club assembler to spill the solvent onto the outside surface of the grip and onto the work table.

Another irritating step in the club grip assembly is when the solvent splashes as it is poured onto the tape covered shaft. The shaft is usually securely held above the work surface in a vice. When the solvent is poured onto the shaft, it splashes once when it strikes the shaft and again when it hits a solvent catching container positioned under the shaft.

A typical solvent catching container is a standard square paint pan. However, paint pans are too large to easily hold it close to the club shaft with one hand when pouring the solvent onto the shaft with the other hand. Additionally, it is very difficult to pour the excess solvent in the pan back into a solvent storage container without spilling.

Therefore, there is a need for a tool that 1) allows a club maker to pour solvent both into the grip mouth and over the tape covered shaft with minimal solvent spillage, and 2) allows for easy pouring of the remaining solvent in the tool into a storage container also with a minimal spillage.

SUMMARY OF THE PREFERRED EMBODIMENT

It is a feature of the invention to provide a device for assisting with installing a slip-on golf grip onto a golf club shaft.

An additional feature of the invention is to provide a device or tool that has a funnel located thereon. Whereby, the funnel is used for mounting a golf club grip thereon, for pouring solvent into the mounted grip with solvent that is residing in the tool container portion, and for pouring unused solvent into a solvent storage container.

Yet a further feature of the invention is to provide a tool that can be easily held below a golf shaft with one hand and pouring solvent thereon with another hand.

3

Still a further feature of the preferred embodiment is to provide a notch on the container portion. The notch serves to position the golf club shaft to be placed below the rim of the container portion of the tool during the pouring of the solvent thereon. Additionally, the notch serves to aid the golf club shaft longitudinal axis to be aligned parallel to the tool's longitudinal axis.

The invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, neither is it intended to be limiting as to the scope of the invention in any way.

BRIEF DESCRIPTION OF THE DRAWINGS

FIG. 1 is a perspective view of the preferred embodiment of the golf grip tool.

FIG. 2 is an end view of the preferred embodiment.

FIG. 3 is a side view of the preferred embodiment.

FIG. 4 is a top view of the preferred embodiment.

Figure 5:
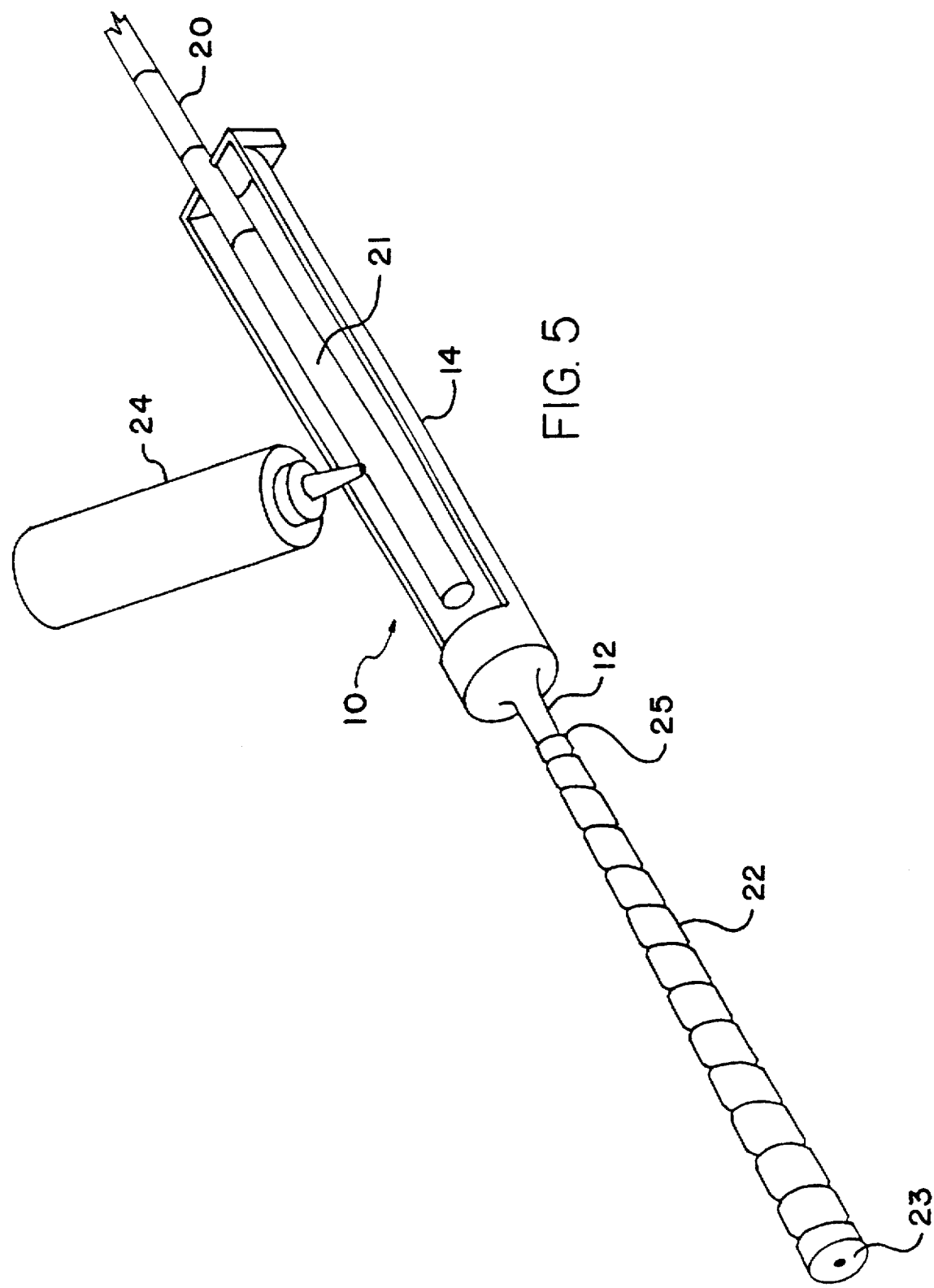
FIG. 5 is a perspective view illustrating use of the preferred embodiment.

It is noted that the drawings of the invention are not to scale. The drawings are merely schematic representations, not intended to portray specific parameters of the invention. The drawings are intended to depict only typical embodiments of the invention, and therefore should not be considered as limiting the scope of the invention. The invention will be described with additional specificity and detail through the use of the accompanying drawings.

Charter by the U.S. Constitution

This disclosure of the invention is submitted in furtherance of the constitutional purposes of the U.S. Patent Laws "to promote the progress of science and useful arts," as stated in Article 1, section 8, clause 8 of the U.S. Constitution.

DETAILED DESCRIPTION OF THE PREFERRED EMBODIMENT

Referring to FIGS. 1 through 5, there are various views of the golf grip assembly tool 10, herein referred to as "tool."

The following elements are found on the various figures: funnel 12, tip 13, container 14, notch 16, stand 18, golf club shaft 20, golf club grip 22, and solvent bottle 24.

The tool 10 has a funnel 12 that is located at one end of the tool 10 with its longitudinal axis is parallel to the longitudinal axis of the tool. It has an attachment tip 13 located at the distal end of the funnel 12. The tip 13 is designed to releasably secure a mouth 25 of a grip 22 that is to be permanently attached to a golf club shaft 20.

The container 14 is circular in cross section and has a length longer than its diameter. It is used to catch the solvent as it drips off of the club shaft 20.

The container 14 has a notch 16 that is located at an end that is opposite to the funnel 12. It is used to both rest the golf club shaft 20 thereon and to position the shaft 20 within the boundaries of the container 14. When the shaft 20 is so positioned, any solvent (not shown) that splashes as it is poured upon the shaft will be more easily caught in the container 14 before being spilled onto the work surface area.

Located below the notch 16 is the stand 18. It stabilizes the rounded design of the container.

There are several methods available for securing a golf club grip onto a golf club shaft using the tool 10. In one method, the club shaft is secured in a vise (not shown) with about fifteen inches of the shaft 20 extending therefrom. Build-up tape (not shown) is wound onto the shaft to ensure a secure fit between the inner diameter of the grip 22 and the outer diameter of the shaft 20. A two sided stick tape 21 is thereby applied over the build-up tape. Backing material covering the second side of the two sided tape is then removed to expose the outer surface in preparation for applying the solvent solution. The grip 22 is secured to the tool 10 by placing the mouth 25 over the tip 13 of the funnel 12. Next, the grip application tool 10 is placed under the tape covered shaft 20. Solvent is thereby poured from the bottle 24 onto the tape 21 to prepare or activate the sticky tape surface. The excess solvent will be caught by container portion 14 of the tool 10. The tool 10 is then removed from under the shaft 20 and thereby tilted to pour the solvent through funnel 12 and into grip 22 to lubricate and prepare the grip to receive the tape covered shaft 20. Grip 22 is thereby removed from the funnel 12. The excess solvent in the grip 22 is poured back into the container portion 14. Finally, the grip 22 is slid over the tape covered shaft 20. Of course the excess solvent can then be poured back into the bottle 24 using the funnel 12.

There are slight variations to the above described method that will be obvious to one skilled in the art after becoming familiar with the present embodiment. Specifically, instead of pouring solvent over the tape covered shaft first, it is equally likely that solvent could be poured into the container portion 14 and then emptied into the grip through the funnel 12. Thereby, the grip is removed, the tool 10 is placed under the tape covered shaft 20 and the solvent located in the grip 22 is poured over the tape 21, where the excess solvent is caught in the container 14.

Remarks About the Preferred Embodiment

One of ordinary skill in the art of golf club making will realize many of the advantages from using the preferred embodiment. For example, the notch 16 allows the shaft 20 to be neatly placed within the confines of the container 14, or to be positioned closer to the bottom of the container. In this position it is easier to catch most all of the poured solvent in the container. Additionally, by designing the tool in a tubular-type shape it is now possible to easily hold the tool under the shaft in one hand and pour the solvent with the other without splashing solvent all over the work area.

A skilled artisan will understand that the attached funnel 12 serves at least three purposes. Besides being used in pouring solvent into the grip, it allows a club maker to easily pour excess solvent back into the bottle, and it serves to securely hold the grip to the tool while doing the other operations.

One skilled in the art will know that there are many steps in a typical golf club grip application process that have not been discussed, yet it is contemplated to incorporate these steps in the usage of the preferred embodiment. For example, it is often helpful to rotate the grip 22 when pouring the solvent out to fully coat the interior with solvent. Additionally, often a golf club grip has a very small hole 23 located at one end that needs to be covered when pouring solvent therein. The hole 23 is often plugged by a golf tee or by placing a finger over the hole, for example.

Variations In The Preferred Embodiment

Although the embodiments only discuss the use of a single container 14 single funnel 12 design, it is contemplated to have a tool 10 that will accommodate two or more club shafts and grips incorporating two or more funnels and notches 16.

The preferred embodiment of the invention discusses the use of a solvent. However, one skilled in the art would easily understand that there are many types of liquids that are used to secure a grip to a shaft. For example, activating agents and lubricants are also considered.

An additional variation of the invention contemplates the use of applying solvents to the shaft through the small hole 23 located at the end of the grip and not through the mouth 25 of the grip.

Even though the preferred embodiment depicts a certain shaped tool 10, many variations are possible. For example, the container could be rectangular, and the funnel could be much shorter, recessed closer within the shape of the tool 10, or even positioned in different locations around the tool (the sides or other end).

While the invention has been taught with specific reference to these embodiments, someone skilled in the art will recognize that changes can be made in form and detail without departing from the spirit and the scope of the invention. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by U.S. patent is:

1. A golf club grip assembly tool, comprising:
   a) an elongated container portion that is sized and dimensioned to capture and subsequently contain substantially all excess liquid that will run off of a horizontally positioned golf club shaft when the liquid is poured along a substantial length of the golf club shaft without having relative motion between the container portion and the golf club shaft;
   b) pouring means, attached to the container portion, for pouring liquid from the container portion; and
   c) golf club shaft securing means, mounted to the container portion, for aligning a golf club shaft to the container portion;
   d) a stabilizer portion, permanently attached to a bottom side of the container portion, sized and dimensioned both to orient the container portion in a horizontal position on a horizontal support surface, and to prevent the container portion from being tipped over if the container portion is lying on the support surface during the capture and subsequent containment of substantially all excess liquid poured onto a length of the golf club shaft; and
   e) securing means, located at an end of the pouring means, sized and dimensioned for releasably securing a mouth of a golf club grip thereon during the time when the liquid is poured from the container portion through the pouring means and into the releasably secured golf club grip.

2. The tool of claim 1, wherein the pouring means has a funnel shape.

3. The tool of claim 1, wherein the container has a bottom surface that is tubular in shape.

4. The tool of claim 1, wherein golf club securing means is a semicircular notch positioned at one end of the container portion.

5. The tool of claim 1, wherein the pouring means is positioned at an opposite end of the container portion to the golf club shaft securing means.

6. An assembly tool used in the operation of placing a golf club grip onto a golf club shaft, comprising:
   a) an elongated container portion that is sized and dimensioned to capture and subsequently contain substantially all excess liquid that will run off of a horizontally positioned golf club shaft when the liquid is poured along a substantial length of the golf club shaft without having relative motion between the container portion and the golf club shaft;
   b) pouring means, attached to the container portion for pouring the liquid from the container portion:
   c) a stabilizer portion, permanently attached to a bottom side of the container portion, sized and dimensioned both to orient the container portion in a horizontal position on a horizontal support surface, and to prevent the container portion from being tipped over if the container portion is lying on the support surface during the capture and subsequent containment of substantially all excess liquid poured onto the substantial length of the golf club shaft;
   d) securing means, located at an end of the pouring means, sized and dimensioned for releasably securing a mouth of a golf club grip thereon during the time when the liquid is poured from the container portion through the pouring means and into the releasably secured golf club grip; and
   e) golf club shaft securing means, mounted to the container portion, for aligning a golf club shaft to the container portion.

7. The assembly tool of claim 6, wherein the pouring means has a funnel shape.

8. The assembly tool of claim 6, wherein the container portion has a bottom surface that is semicircular in cross section.

9. The assembly tool of claim 6, wherein the container portion includes golf club shaft securing means, positioned at one end thereto, for aligning the golf club shaft parallel to a longitudinal axis of the container portion.

* * * * *